(12) United States Patent
Kim et al.

(10) Patent No.: US 8,679,362 B2
(45) Date of Patent: Mar. 25, 2014

(54) NICKEL-ZINC-COPPER BASED FERRITE COMPOSITION, AND MULTILAYERED CHIP DEVICE USING THE SAME

(75) Inventors: Myeong Gi Kim, Gyeonggi-do (KR); Sung Yong An, Gyeonggi-do (KR); Ic Seob Kim, Gyeonggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 13/605,115

(22) Filed: Sep. 6, 2012

(65) Prior Publication Data

US 2013/0062553 A1 Mar. 14, 2013

(30) Foreign Application Priority Data

Sep. 14, 2011 (KR) .................. 10-2011-0092586

(51) Int. Cl.
- *C04B 35/26* (2006.01)
- *C04B 35/64* (2006.01)
- *H01F 1/00* (2006.01)

(52) U.S. Cl.
USPC .............. 252/62.62; 252/62.57; 252/62.58; 252/62.59; 252/62.64

(58) Field of Classification Search
USPC ............ 252/62.57, 62.58, 62.59, 62.6, 62.62, 252/62.64; 336/200
See application file for complete search history.

(56) References Cited

U.S. PATENT DOCUMENTS

| 5,855,810 | A  | * | 1/1999 | Kim .............................. 252/62.6 |
| 2001/0022354 | A1 | * | 9/2001 | Ito et al. ....................... 252/62.6 |
| 2010/0033286 | A1 | * | 2/2010 | Katayama et al. ............. 336/200 |
| 2012/0085963 | A1 | * | 4/2012 | An et al. ...................... 252/62.57 |

FOREIGN PATENT DOCUMENTS

| JP | 2002-255637 | 9/2002 |
| JP | 2007-076985 | 3/2007 |

* cited by examiner

*Primary Examiner* — Emily Le
*Assistant Examiner* — Lynne Edmondson

(57) ABSTRACT

Disclosed herein are a nickel-zinc-copper (NiZnCu) based ferrite composition containing 0.001 to 0.3 parts by weight of bivalent metal, 0.001 to 0.3 parts by weight of trivalent metal, and 0.001 to 0.5 parts by weight of tetravalent metal based on 100 parts by weight of main component containing 47.0 to 50.0 mol % of $Fe_2O_3$, 15.0 to 27.0 mol % of NiO, 18.0 to 25.0 mol % of ZnO, and 7.0 to 13.0 mol % of CuO, and a multilayered chip device and a toroidal core using the same. According to exemplary embodiments of the present invention, a bivalent metal, a trivalent metal, and a tetravalent are contained in a NiZuCu ferrite, thereby making it possible to provide a ferrite composition having excellent quality factor (Q) characteristics. Moreover, it is possible to provide a toroidal core and a multilayered chip device having excellent sinterability, permittivity, and quality factor (Q) characteristics using the ferrite composition.

6 Claims, No Drawings

NICKEL-ZINC-COPPER BASED FERRITE COMPOSITION, AND MULTILAYERED CHIP DEVICE USING THE SAME

CROSS REFERENCE(S) TO RELATED APPLICATIONS

This application claims the benefit under 35 U.S.C. Section 119 of Korean Patent Application Serial No. 10-2011-0092586, entitled "Nickel-Zinc-Copper Based Ferrite Composition, and Multilayered Chip Device Using the Same" filed on Sep. 14, 2011, which is hereby incorporated by reference in its entirety into this application.

BACKGROUND OF THE INVENTION

1. Technical Field

The present invention relates to a nickel-zinc-copper (NiZnCu) based ferrite composition, and a multilayered chip device using the same.

2. Description of the Related Art

Generally, as a magnetic material for a magnetic ceramic component such as a multilayered chip power inductor, or the like, nickel-zinc (NiZn) ferrite, nickel-zinc-copper (NiZnCu) ferrite, or the like, has been mainly used.

Among them, in order to further increase sinterability in the NiZn ferrite, a ternary composition of NiZnCu ferrite obtained by adding Cu to the NiZn ferrite has been mainly used. Meanwhile, in NiZnCu ferrite, Fe may be substituted with other metal ions. Further, in NiZnCu ferrite, Ni, Zn, or Cu may be substituted with other metal ions. That is, Ni, Zn, or Cu is substituted with an element having a similar ionic radius and an element having the same ionic valency to improve characteristics.

Among the above mentioned ferrite materials, the NiZnCu ferrite has been generally used for a multilayered chip inductor, a multilayered chip bead, a multilayered power inductor, or the like. Contents of NiO, ZnO, CuO, and $Fe_2O_3$ configuring the NiZnCu ferrite are changed to change permittivity, quality factor (Q), density, and magnetic characteristics of the NiZnCu ferrite, thereby implementing desired characteristics.

Meanwhile, multilayered chip devices such as a multilayered chip inductor, a multilayered chip bead, and a multilayered power inductor are manufactured using this ferrite composition. In the chip device, an internal electrode is made of silver (Ag).

Since Ag used as a material of the internal electrode has a melting point of 961° C., a ferrite composition fired at a temperature of 961° C. or less is required in order to implement a chip device. When a firing temperature is 900° C., it is preferable that a sintered density is at least about 4.8 g/cm$^3$ or more.

Further, the multilayered power inductor has been used for a direct current (DC)-DC converter. Generally, it is advantageous that a quality factor (Q) is high. The high the quality factor (Q), the more preferable. The reason is that when a large Q means low loss. The quality factor (Q) may be represented by Q=2π fL/Rs, where f means a frequency, L means an inductance value, and Rs means an equivalent series resistance (ESR). As Rs is decreased, efficiency of the DC-DC converter is increased. Therefore, the above equation may be rearranged as follows: Rs=2π fL/Q. Here, when Q is large, Rs becomes small. It is very important factor in a chip device to increase Q.

SUMMARY OF THE INVENTION

An object of the present invention is to provide a NiZnCu based ferrite composition capable of lowering Rs (ESR resistance) by having a high Q and thus raising efficiency of a multilayered chip device as a ferrite composition used in the multilayered chip device.

Another object of the present invention is to provide a toroidal core having a high quality factor (Q) using the ferrite composition.

Another object of the present invention is to provide various multilayered chip devices having a high quality factor (Q) using the ferrite composition.

According to an exemplary embodiment of the present invention, there is provided a nickel-zinc-copper (NiZnCu) based ferrite composition containing 0.001 to 0.3 parts by weight of bivalent metal, 0.001 to 0.3 parts by weight of trivalent metal, and 0.001 to 0.5 parts by weight of tetravalent metal based on 100 parts by weight of main component containing 47.0 to 50.0 mol % of $Fe_2O_3$, 15.0 to 27.0 mol % of NiO, 18.0 to 25.0 mol % of ZnO, and 7.0 to 13.0 mol % of CuO.

The bivalent metal, the trivalent metal, and the tetravalent metal may be contained in an oxide or hydroxide form thereof.

The bivalent may be at least one selected from a group consisting of Co, Mg, and Mn.

The trivalent metal may be at least one selected from a group consisting of Bi, Al, Ga and In.

The tetravalent metal may be at least one selected from a group consisting of Ce, S, Ti, Si, and Zr.

The NiZnCu based ferrite composition may further contain at least one pentavalent metal selected from a group consisting of V, Mo, and W.

According to another exemplary embodiment of the present invention, there is provided a multilayered chip device using the NiZnCu based ferrite composition as described above.

According to still another exemplary embodiment of the present invention, there is provided a toroidal core using the NiZnCu based ferrite composition as described above.

The toroidal core may have a quality factor (Q) of 250 or more.

DESCRIPTION OF THE PREFERRED EMBODIMENTS

Hereinafter, the present invention will be described in more detail.

Terms used in the present specification are for explaining the embodiments rather than limiting the present invention. Unless explicitly described to the contrary, a singular form includes a plural form in the present specification. The word "comprise" and variations such as "comprises" or "comprising," will be understood to imply the inclusion of stated constituents, steps, operations and/or elements but not the exclusion of any other constituents, steps, operations and/or elements.

The present invention relates to a nickel-zinc-copper (NiZnCu) based ferrite composition, and a toroidal core and a multilayered chip device using the same.

The NiZnCu based ferrite composition according to an exemplary embodiment of the present invention may contain 0.001 to 0.3 parts by weight of bivalent metal, 0.001 to 0.3 parts by weight of trivalent metal, and 0.001 to 0.5 parts by weight of tetravalent metal based on 100 parts by weight of main component containing 47.0 to 50.0 mol % of $Fe_2O_3$, 15.0 to 27.0 mol % of NiO, 18.0 to 25.0 mol % of ZnO, and 7.0 to 13.0 mol % of CuO.

The NiZnCu based ferrite composition according to the exemplary embodiment of the present invention is characterized in that a bivalent metal, a trivalent metal, and a tetravalent metal are added to the main component in order to increase sinterability and Q characteristics. However, when addition amounts of the bivalent metal, the trivalent metal, and the tetravalent metal exceed a predetermined range, a secondary phase is generated. Therefore, in the present invention, an addition weight ratio is appropriately limited.

The bivalent metal is at least one selected from a group consisting of Co, Mg, and Mn. It is most preferable that the bivalent metal is Co among them.

A content of the bivalent metal is 0.001 to 0.3 parts by weight based on 100 parts by weight of NiZuCu ferrite main component. When the content of the bivalent metal exceeds 0.3 parts by weight, permittivity may be reduced, which is not preferable. The content of the bivalent metal is a value expressed in terms of an oxide. For example, the bivalent metal may be contained in an oxide form such as CoO or a hydroxide form.

In addition, the trivalent metal is at least one selected from a group consisting of Bi, Al, Ga and In. It is most preferable that the trivalent metal is Bi among them.

A content of the trivalent metal is 0.001 to 0.3 parts by weight based on 100 parts by weight of NiZuCu ferrite main component. When the content of the trivalent metal exceeds 0.3 parts by weight, a defect such as plating bleeding, or the like, at the time of manufacturing of the chip may be caused, which is not preferable. The content of the trivalent metal is a value expressed in terms of the trivalent metal into an oxide. For example, the trivalent metal may be contained in an oxide form such as $Bi_2O_3$ or a hydroxide form.

The tetravalent metal is at least one selected from a group consisting of Ce, S, Ti, Si, and Zr. It is most preferable that the tetravalent metal is Ce among them.

A content of the tetravalent metal is 0.001 to 0.5 parts by weight based on 100 parts by weight of NiZuCu ferrite main component. When the content of the tetravalent metal exceeds 0.5 parts by weight, it is difficult to generate a single phase due to a difference in ionic radius, which is not preferable. The content of the tetravalent metal is a value expressed in terms of the tetravalent metal into an oxide. For example, the tetravalent metal may be contained in an oxide form such as $CeO_2$ or a hydroxide form.

Further, the ferrite composition according to the exemplary embodiment of the present invention may further contain at least one pentavalent metal selected from a group consisting of V, Mo, and W. The pentavalent metal may be selectively added in order to improve sinterability.

In addition, the NiZnCu based ferrite composition according to the exemplary embodiment of the present invention contains 47.0 to 50.0 mol % of $Fe_2O_3$, 15.0 to 27.0 mol % of NiO, 18.0 to 25.0 mol % of ZnO, and 7.0 to 13.0 mol % of CuO as its main component.

In the main component, CuO serves to promote sintering and decrease coercive force. As a content of CuO increases, sinterability becomes excellent at the same temperature. In addition, an increase in content of CuO serves to decrease the coercive force to thereby deteriorate a property of a ferromagnetic material. Therefore, when a content of CuO expressed in terms of an oxide is less than 7.0 mol %, sintering is not smoothly performed, and when it exceeds 13.0 mol %, a property of a ferromagnetic material is deteriorated.

Further, contents of NiO and ZnO contained in the main component may be appropriately adjusted in order to adjust permittivity and a saturation magnetization value. It is generally known in that the lower the content of NiO and the higher the content of ZnO, the higher the permittivity. Therefore, the contents of NiO and ZnO may be changed according to a desired level of permittivity.

In the present invention, 15.0 to 27.0 mol % of NiO and 18.0 to 25.0 mol % of ZnO are contained in the main component. When a content of NiO is less than 15.0 mol %, a saturation magnetization value becomes small and a curie temperature becomes low, and when a content of NiO exceeds 27.0 mol %, permittivity becomes low, which are not preferably.

In addition, when a content of ZnO is less than 18.0 mol %, permittivity becomes low, and when a content of ZnO exceeds 25.0 mol %, a saturation magnetization value becomes small and a curie temperature becomes low, which are not preferable.

The NiZuCu based ferrite composition according to the exemplary embodiment of the present invention contains the bivalent metal, the trivalent metal, and the tetravalent metal, such that quality factor (Q) characteristics may be significantly improved.

In addition, since the NiZuCu based ferrite composition according to the exemplary embodiment of the present invention may be fired at a temperature of 900° C. or less, diffusion of an inner electrode made of silver (Ag) may be suppressed at the time of firing even in an inductor component having the internal electrode. Therefore, characteristics of the inductor component may be improved.

A method of producing a NiZnCu based ferrite composition according to an exemplary embodiment of the present invention will be described in detail.

A ferrite raw material is first prepared. Each of metal salts of Fe, Ni, Zn, Cu, a bivalent metal, a trivalent metal, and a tetravalent metal is prepared and weighted as the ferrite raw material. Here, an oxide or a hydroxide may be used as the metal salt.

Then, the material is milled in a liquid state and then dried in a drying oven. A dried powder is pulverized and then calcined at a temperature of 700 to 800° C. The calcination temperature is set to a temperature at which a ferrite single phase is generated rather than a hematite (a-$Fe_2O_3$) phase, which is a secondary phase. The calcined powder is pulverized by milling to produce a final ferrite powder.

In the ferrite powder produced as described above, each of contents expressed in terms of an oxide may be 0.001 to 0.3 parts by weight of bivalent metal, 0.001 to 0.3 parts by weight of trivalent metal, and 0.001 to 0.5 parts by weight of tetravalent metal based on 100 parts by weight of main component containing 47.0 to 50.0 mol % of $Fe_2O_3$, 15.0 to 27.0 mol % of NiO, 18.0 to 25.0 mol % of ZnO, and 7.0 to 13.0 mol % of CuO.

The ferrite powder according to the exemplary embodiment of the present invention may be produced by a known solid state method, a liquid state method, or the like, but is not particularly limited thereto.

Meanwhile, according to the exemplary embodiment of the present invention, a ferrite sheet is produced using a ferrite composition containing the ferrite powder, an internal electrode is printed, and punching, compressing, cutting, and firing processes are then performed, such that a low temperature fired magnetic ceramic component such as a chip power inductor is manufactured.

Further, the ferrite composition may be used as a material of a toroidal core shaped inductor as well as a material of the low temperature fired magnetic ceramic component such as the chip power inductor.

When the ferrite composition is used to manufacture the above-mentioned component, it is sintered at a temperature of 850 to 920° C., and preferably, 880 to 920° C., thereby making it possible to provide a multilayered chip bead material, chip inductor, and toroidal core.

According to the exemplary embodiment of the present invention, a quality factor (Q) of the toroidal core is preferably 250 or more.

Hereinafter, Examples of the present invention will be described. The following Examples are only to exemplify the present invention, and the scope of the present invention should not be interpreted to being limited to these Examples. Further, although the following Examples exemplify the present invention using specific compounds, it is obvious to those skilled in the art that the same or similar effect may also be generated in the case of using equivalents to the specific compounds.

Examples 1 to 3 and Comparative Examples 1 to 5

NiZuCu based ferrite compositions according to Examples and Comparative Examples were produced using compositions shown in the following Table 1.

As each stating raw material, oxides of a NiZuCu ferrite metal, a bivalent metal, a trivalent metal, and a tetravalent metal were weighted and mixed with each other according to each content thereof, milled in a liquid state, and then dried in a drying oven. A dried powder was pulverized and then calcined at a temperature of 700 to 800° C. Then, milling, drying, disintegrating processes were performed to obtain a ferrite composition powder.

TABLE 1

| | Main component (Mol %) | | | | Sub component (parts by weight) | | | |
|---|---|---|---|---|---|---|---|---|
| | $Fe_2O_3$ | NiO | ZnO | CuO | CoO | $Bi_2O_3$ | $CeO_2$ | $V_2O_5$ |
| Comparative Example 1 | 49 | 18 | 22 | 11 | — | — | — | — |
| Comparative Example 2 | 49 | 18 | 22 | 11 | — | — | 0.6 | — |
| Comparative Example 3 | 49 | 18 | 22 | 11 | 0.15 | — | 0.5 | — |
| Comparative Example 4 | 49 | 18 | 22 | 11 | 0.25 | — | — | — |
| Comparative Example 5 | 49 | 18 | 22 | 11 | 0.2 | 0.1 | — | — |
| Example 1 | 49 | 18 | 22 | 11 | 0.2 | 0.2 | 0.3 | — |
| Example 2 | 49 | 18 | 22 | 11 | 0.2 | 0.2 | 0.3 | 0.1 |
| Example 3 | 49 | 18 | 22 | 11 | 0.15 | 0.1 | 0.1 | — |

The respective ferrite compositions produced according to Examples and Comparative Examples were manufactured in a toroidal core form and fired at a temperature of 880 to 920° C., and their permittivity, Q, density, or the like, were measured. The permittivity and Q were measured at 1 MHz after a wire is wound ten times around the toroidal core. The measurement results were shown in the following Table 2.

TABLE 2

| | Permittivity | Quality Factor (Q) | Density (g/cc) |
|---|---|---|---|
| Comparative Example 1 | 165 | 142 | 5.01 |
| Comparative Example 2 | 120 | 140 | 5.02 |
| Comparative Example 3 | 138 | 150 | 4.92 |
| Comparative Example 4 | 134 | 231 | 4.91 |
| Comparative Example 5 | 142 | 220 | 4.97 |
| Example 1 | 195 | 313 | 5.20 |
| Example 2 | 197 | 322 | 5.25 |
| Example 3 | 190 | 260 | 5.05 |

It could be appreciated from the results of the above Table 2 that +bivalent CoO, +trivalent $Bi_2O_3$, +tetravalent $CeO_2$ are added to the NiZnCu based ferrite, such that a quality factor (Q) is significantly increased. In addition, when +pentavalent $V_2O_5$ is additionally added (Example 2), sinterability may be further improved.

However, it was measured that in the case of Comparative Example 1 in which only a NiZnCu ferrite main component is contained and Comparative Examples 2 to 5 in which all of a bivalent metal, a trivalent metal, and a the tetravalent metal are not contained but one or two of them is contained, all of sinterability, permittivity, quality factor (Q) are lower as compared to a case in which the NiZuCu based ferrite composition according to Examples of the present invention is used.

Particularly, it could be appreciated that the toroidal core using the NiZuCu based ferrite composition according to Examples of the present invention has a high quality factor (Q) of 250 or more.

It was confirmed from these results that the bivalent metal, the trivalent metal, and the tetravalent metal are contained in the NiZnCu based ferrite main component, thereby making it possible to improve all of the sinterability, the permittivity, the quality factor (Q) characteristics.

According to exemplary embodiments of the present invention, a bivalent metal, a trivalent metal, and a tetravalent are contained in a NiZuCu ferrite, thereby making it possible to provide a ferrite composition having excellent quality factor (Q) characteristics.

In addition, it is possible to provide a toroidal core and a multilayered chip device having excellent sinterability, permittivity, and quality factor (Q) characteristics using the ferrite composition.

While the present invention has been shown and described in connection with the embodiments, it will be apparent to those skilled in the art that modifications and variations can be made without departing from the spirit and scope of the invention as defined by the appended claims.

What is claimed is:

1. A nickel-zinc-copper (NiZnCu) based ferrite composition containing 0.001 to 0.3 parts by weight of at least one bivalent metal selected from a group consisting of Co, Mg, and Mn, 0.001 to 0.3 parts by weight of at least one trivalent metal selected from a group consisting of Bi, Al, Ga and In, and 0.001 to 0.5 parts by weight of at least one tetravalent metal selected from a group consisting of Ce, S, Ti, Si, and Zr based on 100 parts by weight of main component containing 47.0 to 50.0 mol % of $Fe_2O_3$, 15.0 to 27.0 mol % of NiO, 18.0 to 25.0 mol % of ZnO, and 7.0 to 13.0 mol % of CuO.

2. The NiZnCu based ferrite composition according to claim 1, wherein the bivalent metal, the trivalent metal, and the tetravalent metal are contained in an oxide or hydroxide form thereof.

3. The NiZnCu based ferrite composition according to claim 1, further containing at least one pentavalent metal selected from a group consisting of V, Mo, and W.

4. A multilayered chip device using the NiZnCu based ferrite composition according to claim 1.

5. A toroidal core using the NiZnCu based ferrite composition according to claim 1.

6. The toroidal core according to claim 5, wherein it has a quality factor (Q) of 250 or more.

* * * * *